Patented Sept. 19, 1950

2,522,504

UNITED STATES PATENT OFFICE 2,522,504

GLUTEN PHOSPHATES AND METHOD FOR PREPARING THEM

Robert E. Ferrel, Hammond, Oreg., and Harold S. Olcott, Berkeley, Calif., assignors to the United States of America as represented by the Secretary of Agriculture No Drawing. Application March 22, 1949, Serial No. 82,901

6 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to derivatives of gluten, more particularly to gluten phosphates and method for preparing them, and has for its objects the provision of new and useful protein derivatives, and processes for their production.

It has now been found that gluten phosphates can be prepared by reacting gluten with phosphoric acid containing excess of phosphorus pentoxide.

The gluten phosphates so obtained form stable salts with basic substances and the salts, particularly the ammonium and alkali-metal salts, possess the unique property of readily absorbing large quantities of water thereby forming colorless, odorless, and tasteless gels. The volume of such aqueous gels is approximately one hundred times that of the dry salt. Because of this property, the ammonium and alkali metal salts of gluten phosphate are valuable as substitutes for natural gums such as gum tragacanth, acacia, and so forth. Thus these salts can be used as protective colloids in frozen fruit purees and ice cream, as stiffening or bodying agents in pie fillings such as custards and frozen-fruit fillings, as emulsifying or carrying agents in pharmaceutical pastes, salves, and ointments, and so forth.

In general, the products of this invention are prepared by reacting gluten with phosphoric acid containing an excess of phosphorus pentoxide. Generally, the reaction is conducted at room temperature (about 25° C.) since elevated temperatures tend to cause degradation of the protein. The time of reaction depends on the nature of the reactants and the operating conditions. Generally, the reaction is allowed to proceed for an extended period of time, for example, more than 24 hours to ensure complete reaction. The products are recovered by pouring the acid reaction mixture on crushed ice, or equivalent cooling medium, neutralizing with the desired base, washing the gluten phosphate salt until free from inorganic phosphate ions, and then drying the washed product. This drying step may be expedited by treating the washed salt with an organic solvent such as alcohol or acetone whereby the water is replaced by solvent and residual solvent can be readily removed by evaporation. The washing step can also be carried out by using in place of water an aqueous solution of an ammonium salt of a weak, volatile acid, i. e., ammonium carbonate or bicarbonate. This procedure is advantageous as the presence of the ions in the aqueous solution prevent undue swelling of the gluten phosphate salt during the washing treatment. After the washing is completed, the excess of ammonium salt is readily removed by subjecting the product to moderate heat, with or without vacuum, whereby the ammonium salt is decomposed and vaporized thus leaving as a residue the purified gluten phosphate salt. The method of washing hydrophilic colloids in this manner is described and claimed in the patent application of W. D. Ramage, Serial No. 743,211, filed Apr. 22, 1947, now Patent No. 2,474,367. The basic material used in the neutralization step depends on the salt desired. Thus if the sodium salt of gluten phosphate is desired then sodium hydroxide is used for the neutralization. Obviously any basic material can be used to prepare any desired salt. Suitable basic materials are, for example, sodium carbonate or bicarbonate; potassium hydroxide, carbonate or bicarbonate; ammonia; carbonates of ammonia; calcium hydroxide and so forth. If desired organic bases can be used for the neutralization, for example, trimethyl amine, mono-, di-, or triethanol amine, quaternary ammonium hydroxides, and so forth.

The following example is given as an illustrative embodiment of a manner in which this invention may be carried out in practice.

Example

The phosphating reagent was prepared by adding 75 grams of phosphorus pentoxide to 100 grams of 85% phosphoric acid, heating and mixing to dissolve the pentoxide. The resulting solution (containing about 78% $P_2O_5$) was then cooled to room temperature. One hundred mg. of fine ground gluten was added to 10 ml. of the cooled phosphating reagent and stirred. The mixture was placed in a desiccator over phosphorus pentoxide to react for three days at room temperature. The reaction mixture was stirred several times during the first 24 hours to disperse any lumps formed. After seventy-two hours the reaction mixture was diluted with crushed ice, neutralized with sodium hydroxide, washed and dried. Sodium gluten phosphate was obtained in a yield of 50% and analysis showed that 15.8 equivalents of phosphorus per 104 grams of original material had been introduced. This product was found to have a hydration capacity of 100, that is, when one part of the sodium gluten phosphate was contacted with an excess of water it formed 100 parts of a water-sodium gluten phosphate gel.

It is to be emphasized that the gluten phosphates produced in accordance with this invention contain phosphate radicals in stable combination with gluten. As a result solutions of the novel products can be made acid or alkaline and the phosphate radicals remain combined with the gluten. Thus these products are to be distinguished from materials produced by precipitating proteins from solution with phosphoric acid. Such materials do not possess a stable combination but are in the nature of ionic salts and the original protein can be obtained when the material is subjected to alkaline conditions. Further, such ionic salts do not possess the gelling properties of the gluten phosphates herein disclosed.

Having thus defined our invention, we claim:

1. A gluten phosphate.
2. A salt of gluten phosphate.
3. The sodium salt of gluten phosphate.
4. Process for preparing a gluten phosphate which comprises reacting gluten with phosphoric acid containing excess phosphorus pentoxide.
5. Process for preparing a gluten phosphate which comprises reacting gluten with phosphoric acid containing about 78% $P_2O_5$.
6. Process for preparing the sodium salt of gluten phosphate which comprises reacting gluten at approximately room temperature with phosphoric acid containing about 78% $P_2O_5$, neutralizing the acid reaction mixture with sodium hydroxide and isolating the sodium salt of gluten phosphate.

ROBERT E. FERREL.
HAROLD S. OLCOTT.

REFERENCES CITED

The following references are of record in the file of this patent:

UNITED STATES PATENTS

| Number | Name | Date |
|---|---|---|
| 2,413,983 | Lustig et al. | Jan. 7, 1947 |

OTHER REFERENCES

Reitz et al., Ind. and Eng. Chem., Dec. 1944, vol. 36, pages 1149 to 1151.

Reitz et al., Jour. Amer. Chem. Soc. (1946), vol. 68, pages 1024 to 1031.